3 Sheets--Sheet 1.
G. REHFUSS.
Sewing-Machines.
No. 5,260. Reissued Jan. 28, 1873.
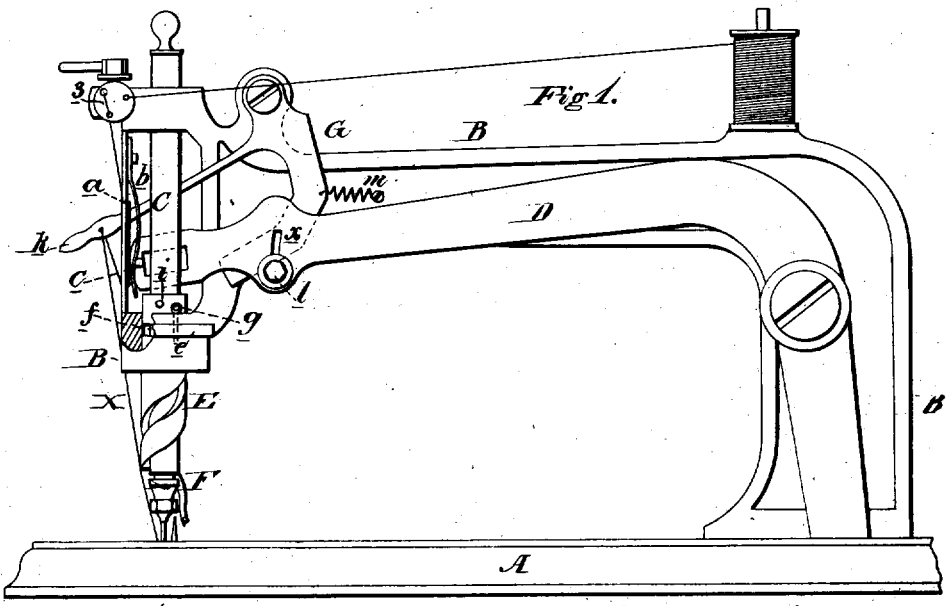
Fig 2.
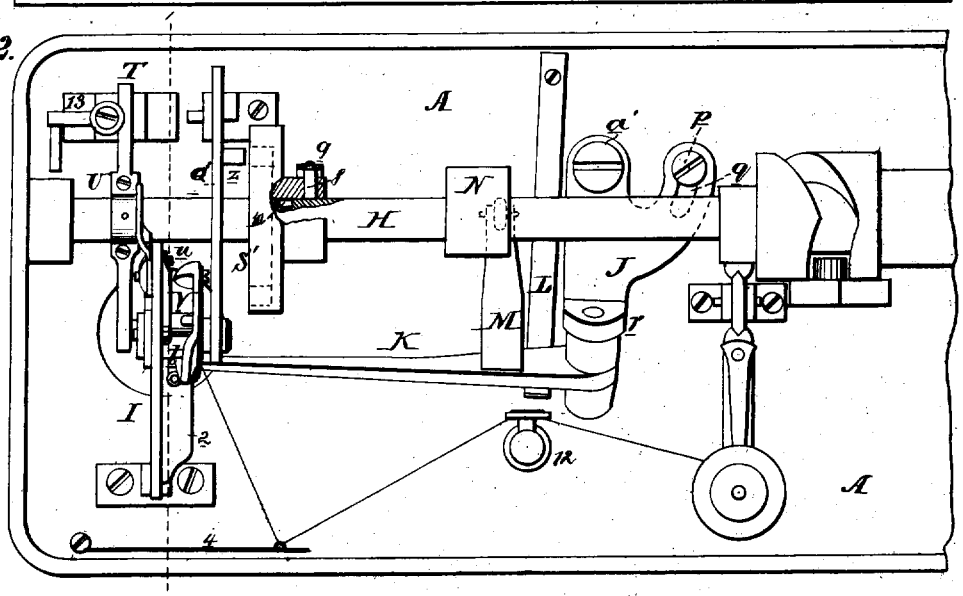
Witnesses.
Harry Smith
Thomas. McIlvain
Inventor.
George Rehfuss
by his Attys.
Newton and Son

G. REHFUSS.

Sewing-Machines.

No. 5,260. Reissued Jan. 28, 1873.

Witnesses.
Harry Smith
Thomas McIlvain

Inventor.
George Rehfuss
by his Attys
Howson and Son.

G. REHFUSS.

Sewing-Machines.

No. 5,260. Reissued Jan. 28, 1873.

Witnesses. Harry Smith
Thomas M. Swain

Inventor.
George Rehfuss
by his Attys.
Hoson & Dodson

UNITED STATES PATENT OFFICE.

GEORGE REHFUSS, OF PHILADELPHIA, PA., ASSIGNOR TO AMERICAN BUTTON-HOLE, OVERSEAMING, AND SEWING MACHINE COMPANY.

IMPROVEMENT IN SEWING-MACHINES.

Specification forming part of Letters Patent No. 51,086, dated November 21, 1865; antedated November 11, 1865; reissue No. 5,260, dated January 28, 1873.

*To all whom it may concern:*

Be it known that I, GEORGE REHFUSS, of the city and county of Philadelphia, State of Pennsylvania, have invented certain Improvements in Sewing-Machines, of which the following is a specification:

The main object of my invention is to make with one sewing-machine either the ordinary lock-stitch or a button-hole stitch; and this object I attain in a manner which I will now proceed to describe, reference being had to the accompanying drawing, in which—

Figure 3:
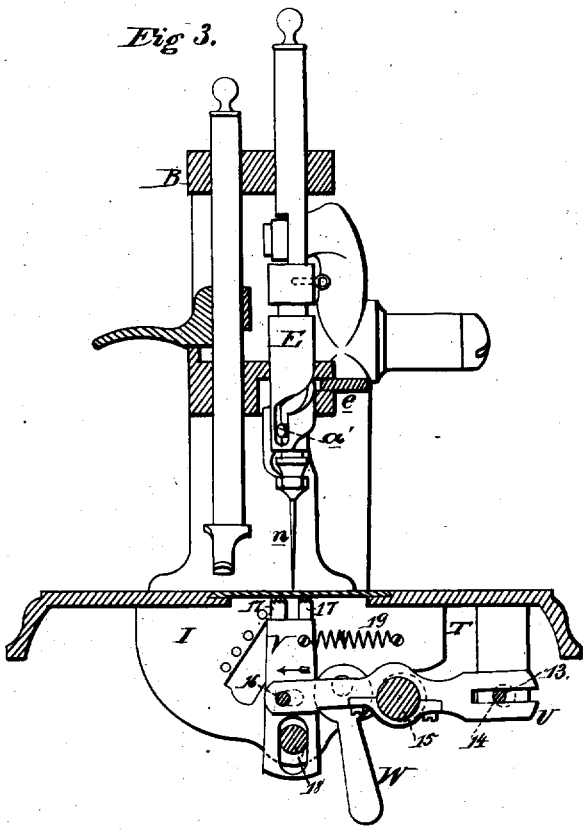
Figure 4:
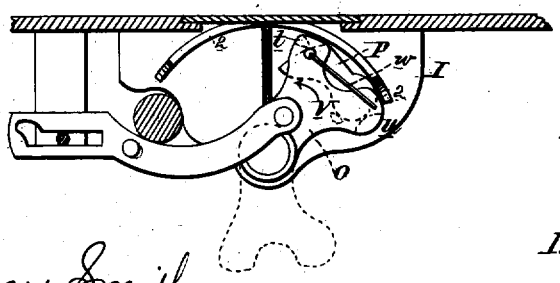
Figure 5:
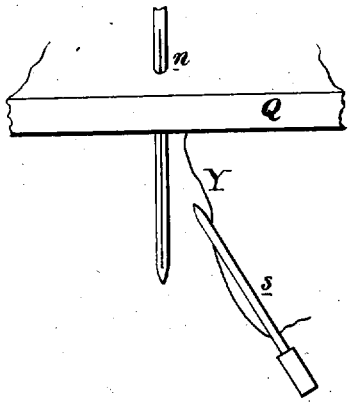

Figure 1, Sheet 1, is a side view of the improved sewing-machine as arranged for sewing button-holes; Fig. 2, an inverted plan view of Fig. 1; Fig. 3, Sheet 2, a vertical section, showing the parts arranged for making the ordinary lock-stitch; Fig. 4, a transverse section on the line 1 2, Fig. 2; Figs. 5, 6, 8, and 9, views illustrating the mode of forming the stitch; and Fig. 7, an enlarged view of part of the machine.

It may be advisable for the better illustration of my invention to refer in the outset to the mode of making the button-hole stitch, which is similar to that described in the patent allowed to my assignees on the 31st day of December, 1864, and granted to them on the 23d day of May, 1865, and which may be described in the following brief terms, reference being had to Figs. 5, 6, 8, and 9 in Sheet 3 of the drawing.

Figure 6:
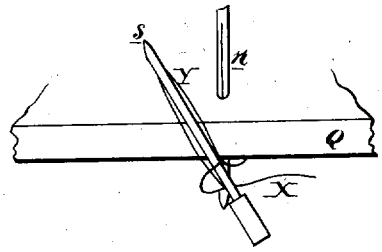

As the ordinary eye-pointed needle *n* begins to rise a loop of its thread X will be formed beneath the fabric Q, and this loop will be penetrated by an inclined needle, *s*, which carries a loop of thread Y across the edge of the fabric Q to the position shown in Fig. 6, Sheet 3. As the needle *n* continues its upward movement an arm, F, catching the loop of thread Y at the side of the needle *s*, carries it to the position shown in Fig. 8, so that the said loop shall be spread beneath the point of the needle *n*, which, as it descends, penetrates the said loop and enters the fabric after the latter has been moved by the feed to the length of one stitch. When the needle *n* again rises another loop of thread X is formed, and this loop is penetrated by the needle *s*, as before, the thread Y being thus carried back and forth across the edge of the fabric and locked to the same by the thread X so as to form a binding over the edge of the fabric, such as is required for button-holes.

The method of so altering the machine that it will make the ordinary lock-stitch is fully explained hereafter.

*General Description.*

A is the bed-plate of the machine, on which is the usual stationary arm B, and in the front end of the latter slides a needle-arm, C, to which a reciprocating motion is imparted through the medium of a needle-lever, D, from a scroll-cam on the driving-shaft H. To the front end of the stationary arm B is secured a perforated plate, *a*, Fig. 1, to the rear of which is secured a spring, *b*, and from the end of the arm D projects a pin, *c*, which, during a portion of the movement of the arm, actuates the said spring *b*. On the lower portion of the needle-bar is a sleeve, E, having a spiral groove, into which projects a pin, *a'*, Fig. 3, on the needle-bar, the sleeve being retained in its proper vertical position by a plate, *e*, which projects into an annular recess, *f*, in the upper end of the sleeve, the said plate being hinged to the stationary arm B, and being, in the present instance, retained in its position by a pin, *g*, which passes through an opening in the arm B and into the plate. In the upper end of the sleeve is an orifice, *i*, and in the needle-bar is an opening, which, when the bar is in the position shown in Fig. 1, corresponds with the said orifice *i*, for the purpose described hereafter. To the lower end of the sleeve E is secured an arm, F, at the end of which is a curved projection, this being the arm above referred to, and illustrated in Fig. 8 as catching and spreading the loop of thread Y. To a pin in the upper side of the arm B is hung a lever, G, from which projects an arm, *k*, having an eye for guiding the thread X. Through a slot, *x*, in the needle-arm D projects an adjustable pin, *l*, which bears against the rear edge of the lever G, the latter being maintained by a spring, *m*, in contact with the said pin. In suitable bearings on the under side of the bed-plate turns a driving-shaft, H, and to the said bed is secured a vertical plate, i, having at its rear a vertical groove, *i*, for the reception of the needle *n*, and an inclined groove or recess, *i'*, for permitting the inclined needle *s* to take its proper course in proximity to the needle *n*. The plate is also cut away at *i''* to allow for the free movement of the said needle *s*, as best observed in the enlarged view, Fig. 7. An adjustable plate, J, Fig. 2, is secured to the under side of the base A by a pin, *a'*, and is retained in either of the two positions which it has to occupy by a set-screw, *p*, passing through a curved slot, *q*, into the base. On one side of the plate J is an inclined projection, *r*, to which is hung a lever, K, carrying at its outer end the needle *s*, above referred to as carrying the thread Y across the edge of the fabric. Against the upper edge of the lever K bears a spring, L, secured to the base-plate, and from the side of the lever K projects an arm, M, a roller on the end of the latter bearing against the upper side of a cam, N, on the driving-shaft. At the front of the stationary arm B is a tension device for the upper thread X, and on the under side of the base-plate is a spring take-up, 4, and a tension device, 12. To the rear of the vertical plate I is hung a shuttle-carrier, O, best observed in Figs. 4 and 7, and from the side of this carrier nearest to the plate project lugs *t*, *u*, and *v*, Figs. 2 and 4, and on these rests the shuttle P, the point of which is maintained in close contact with the plate I by a spring, *w*. From the side of the plate I above the shuttle projects a curved plate, 2, Figs. 4 and 7. To the side of the carrier O is jointed one end of an arm, Q', the other end of which is supported by a pin, 5, projecting from a bracket, R, into a slot, 6, in the arm. On the shaft H is a wheel, S', in the face of which is a cam-groove for receiving a pin, *z*, on the arm Q', and through the side of the wheel passes a pin, 8, which is secured to a spring, 9, the said spring projecting into a recess in the shaft, excepting when the wheel, which can be moved to a limited extent on the shaft, is in the position shown in Fig. 2. Through a bracket, T, passes a bar, 13, a portion, 14, Fig. 3, of which is made eccentric, the bar passing through a slot in the lever U, and through the center of the said lever passes an eccentric portion, 15, of the driving-shaft H. A pin, 16, projects from the inside of the lever U into a slot in the bar or plate V, which is adjacent to the plate I, and on the upper end of which are the serrated feed-lugs 17 17, a pin, 18, passing through a slot in the lower end of the said plate V and retaining the latter in contact with the plate I, on the side of which is a handled cam, W, with the edge of which the bar V is maintained in contact by a spiral spring, 19.

Figure 7:
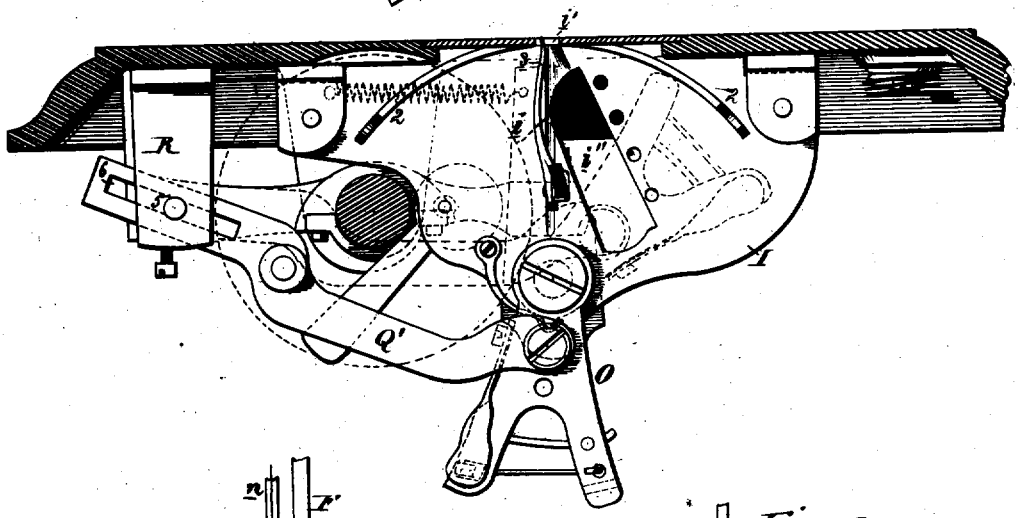
Figure 8:
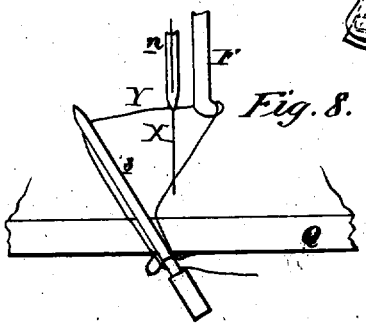
Figure 9:
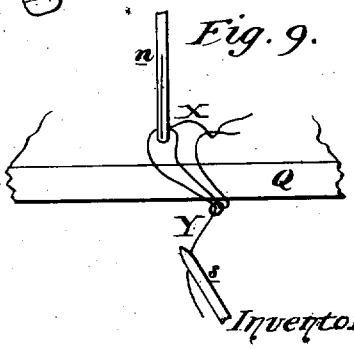

When the machine has to be used for sewing button-holes the different parts are adjusted to the positions shown in Figs. 1 and 2, the shuttle P being removed and the carrier O turned down to the position shown in Fig. 7. The upper thread X is then carried from the spool to the tension device, and passed through one or more openings in the latter, through one of the openings in the plate *a*, and along the inner side to an opening at the lower part of the same, through the latter to an eye near the end of the arm *k*, and thence to the needle *n*. The under thread Y is carried from the spool to the tension device 12, thence to the eye of the spring take-up 4, and thence to the needle *s*.

In operating the machine the under thread will be carried upon and across the edge of the fabric by the needle *s*, and then, by the arm F, over the top of the fabric, to which it is secured by the thread X carried by the needle *n*, as fully described above, and in the aforesaid patent granted to my assignees on the 23d day of May, 1865. As the arm D rises the pin *l* will move the lever G forward, and the arm *k* will consequently be raised, the lever being depressed on the downward motion of the arm D by the spring *m*. As the arm D rises the pin *c* will force the spring *b* against the plate *a* until the arm has nearly reached the limit of its upward motion, so that the thread will be held tightly between the spring and the plate, while at the same time the slack thread is taken up, and the stitch just formed is drawn close to the cloth by the upward movement of the take-up arm *k*. When the needle again descends the arm *k* will be quickly lowered, so as to furnish a plentiful supply of thread for forming the loop. As the lever U is raised and moved in the direction of the arrow, Fig. 3, by the revolution of the driving-shaft H, the pin 16 will be moved forward in the slot of the plate V until it strikes the end of the same, when the said plate, which has been raised with the end of the lever, will also be carried forward with the same in the direction of the arrow, and the serrated projections 17 17, being brought against the under side of the fabric, will move the latter a short distance on the work-plate. As the shaft H continues its revolution the end of the lever and plate V will both be depressed, and will both be carried back toward their original position, the backward motion of the plate V being arrested when the same strikes the edge of the cam W, by turning which the extent of the motion of the plate V may be easily regulated.

It will also be seen that, by turning the rod 13, the eccentric portion 14 of the same within the slot in the lever U may be brought to a position to either raise or depress the end of the lever, and consequently regulate the distance to which the projections 17 17 will be raised above the work-plate.

When the machine is to be employed for sewing the ordinary lock-stitch the parts are in the first instance brought to the position shown in Figs. 1 and 2, and the pin *g* is removed and passed through the opening *i* in the sleeve E, and into the needle-bar C, the plate *e* being turned back so that its edge is removed from the annular groove *f*; and the sleeve E, being thus secured to the needle-bar, has to rise and descend with the latter.

The set-screw *p*, Fig. 2, is now loosened, and the plate J is turned back, so as to remove the end of the arm K from the vicinity of the plate I, and the outer end of the arm M from contact with the cam N. The shuttle-carrier O is now brought to the position shown in Fig. 4; the shuttle P is inserted into the same, where it is retained between the lugs *t*, *u*, and *v* and the plates I and 2. The wheel S′ is then moved forward on the shaft H until the pin *z* on the arm Q′ occupies a position within the cam-groove in the face of the wheel, the pin 8 being forced by the spring into the recess 10, thereby securing the wheel in its position. The pin *l* is then raised to the upper end of the slot *x* in the arm D, and secured in this position, and the thread X is conducted from the spool to the needle *n*, as in the first instance. The fabric is now placed on the work-plate and the machine set in motion. After the needle *n* has descended through the fabric into the groove, and has begun its upward motion a loop of thread, X, will be formed at the side of the same; the shuttle-carrier will then move forward in the direction of the arrow, Fig. 4 and carry the shuttle through the loop, with a result which needs no description.

The take-up arm K, the thread-tension, and the feed devices are adjusted and operated in the same manner as when the machine is adjusted for sewing button-holes, while all the devices which are used only for this latter purpose are secured in such positions as not to interfere with the operation of the machine as adjusted for lock-stitch sewing.

It will be seen that the changes necessary for adapting the machine for either class of work can be readily and quickly made; that the devices are all simple in construction, and such as can be readily understood by those familiar with sewing-machines.

I claim—

1. The lever K and its needle *s* carrying a loop of thread across the edge of the fabric, when the said lever is so connected to a permanent part of the machine as to be adjustable, substantially in the manner and for the purpose specified.

2. The combination of the shuttle-carrier O, the cam-wheel S′, and arm Q′, the whole being constructed and arranged for adjustment, substantially as and for the purpose herein set forth.

3. The sleeve E, adapted to the needle-bar and to the stationary arm B in the manner described, in combination with the devices herein set forth, or their equivalents, whereby the said sleeve may be put in or out of action, as desired.

4. The take-up mechanism, consisting of the adjustable pin *l* on the needle-arm D, the lever G and its arm *k*, and tension device 3, the whole being arranged and operating substantially as and for the purpose herein set forth.

In testimony whereof I have signed my name to this specification in the presence of two subscribing witnesses.

GEO. REHFUSS.

Witnesses:
WM. A. STEEL,
HUBERT HOWSON